United States Patent [19]
Takagishi et al.

[11] Patent Number: 6,111,045
[45] Date of Patent: Aug. 29, 2000

[54] DIENE RUBBER, PROCESS FOR PREPARING SAME, AND COMPOSITION CONTAINING SAME

[75] Inventors: Yukio Takagishi; Masao Nakamura, both of Kawasaki, Japan

[73] Assignee: Nippon Zeon Co. Ltd., Tokyo, Japan

[21] Appl. No.: 09/101,040

[22] PCT Filed: Dec. 19, 1996

[86] PCT No.: PCT/JP96/03706

§ 371 Date: Jun. 29, 1998

§ 102(e) Date: Jun. 29, 1998

[87] PCT Pub. No.: WO97/24383

PCT Pub. Date: Jul. 10, 1997

[30] Foreign Application Priority Data

Dec. 29, 1995 [JP] Japan ................................ 7-352545

[51] Int. Cl.⁷ ............................. C08F 236/14; C08K 3/36
[52] U.S. Cl. .................. 526/338; 526/251; 526/265; 526/272; 526/293; 526/304; 526/310; 526/312; 526/316; 526/320; 526/329.1; 526/332; 524/545; 524/548; 524/555
[58] Field of Search ..................... 526/338, 251, 526/265, 272, 293, 304, 312, 316, 320, 329.1, 332, 310; 524/555

[56] References Cited

U.S. PATENT DOCUMENTS

| | | | |
|---|---|---|---|
| 2,834,747 | 5/1958 | Short et al. | 526/338 X |
| 2,950,270 | 8/1960 | Chapin et al. | 526/338 |
| 2,951,831 | 9/1960 | Reinhard et al. | 526/338 |
| 3,687,914 | 8/1972 | Thienot et al. | 526/338 |
| 5,430,095 | 7/1995 | Ishiura et al. | |

FOREIGN PATENT DOCUMENTS

| | | |
|---|---|---|
| 54-58789 | 5/1979 | Japan . |
| 61-268709 | 11/1986 | Japan . |
| 6422940 | 1/1989 | Japan . |
| 1101344 | 4/1989 | Japan . |
| 1188501 | 7/1989 | Japan . |
| 39910 | 1/1991 | Japan . |
| 5230286 | 9/1993 | Japan . |
| 5271477 | 10/1993 | Japan . |
| 6100730 | 4/1994 | Japan . |

OTHER PUBLICATIONS

Hawley's Condensed Chemical Dictionary, 11th ed., Van Nostrand Reinhold, N.Y., 1987, p. 20.

Hackh's Chem. Dictionary, 4th ed, J. Grant (ed.), McGraw–Hill, N.Y., pp. 35 and 557, 1969.

*Primary Examiner*—Fred Teskin

[57] ABSTRACT

This invention provides a diene rubber composed of 40 to 99.99% by weight of conjugated diene units, 0.05 to 20% by weight of amino-containing vinyl monomer units, 0.05 to 20% weight of hydroxyl-containing vinyl monomer units, and 0 to 50% by weight of other copolymerizable monomer units, and having a Mooney viscosity ($ML_{1+4}$, 100° C.) of 10 to 200. This diene rubber yields a vulcanized rubber showing improvements in heat build-up, tensile strength, abrasion resistance and processability.

22 Claims, No Drawings

DIENE RUBBER, PROCESS FOR PREPARING SAME, AND COMPOSITION CONTAINING SAME

TECHNICAL FIELD

This invention relates to a diene rubber which has excellent processability and, when silica is incorporated thereinto as a reinforcing agent, can yield a vulcanized rubber showing improvements in heat build-up, tensile strength and abrasion resistance; a process for preparing such a diene rubber; and rubber compositions comprising a rubber component containing such a diene rubber, and a reinforcing agent.

BACKGROUND ART

In recent years, as growing importance is attached to resource saving and environmental protection, the demand for a reduction in the fuel consumption of automobiles has become increasingly stronger. Also for automobile tires, it is desired to reduce their rolling resistance and thereby contribute to a reduction in fuel consumption. In order to reduce the rolling resistance of tires, it is common practice to use, as the rubber material for tires, a rubber material which can yield a vulcanized rubber showing a low degree of heat build-up.

Conventionally, it has been proposed to reduce heat build-up by using, as the rubber material for tires, a rubber composition comprising a diene rubber into which, in place of carbon black, silica is incorporated as a reinforcing agent. However, as compared with carbon black-filled rubber compositions, such silica-filled rubber compositions have the disadvantage that they fail to achieve sufficient abrasion resistance and tensile strength. One of the causes therefor is believed to be that silica has a lower affinity for diene rubbers than carbon black and hence fails to exhibit a sufficient reinforcing effect.

Conventionally, in order to enhance the affinity of silica for diene rubbers, the use of a diene rubber into which a substituent group having an affinity for silica has been introduced is being investigated. For example, diene rubbers having a tertiary amino group introduced thereinto (Japanese Patent Laid-Open No. 101344/'89) have been proposed for diene rubbers formed by emulsion polymerization; and diene rubbers having introduced thereinto an alkylsilyl group (Japanese Patent Laid-Open No. 188501/'89), a halogenated silyl group (Japanese Patent Laid-Open No. 230286/'93) or a substituted amino group (Japanese Patent Laid-Open No. 22940/'89) have been proposed for diene rubbers formed by anionic polymerization.

However, most of the diene rubbers having the aforesaid substituent groups introduced thereinto show poor processability because, when they are mixed with silica, they cohere strongly with silica and cannot be dispersed satisfactorily. Moreover, they also have the disadvantage that vulcanized rubber properties such as heat build-up, tensile strength and abrasion resistance are not fully improved.

An object of the present invention is to provide a diene rubber which has excellent processability and, when silica is incorporated thereinto as a reinforcing agent, can yield a vulcanized rubber that shows a low degree of heat build-up and has substantially the same tensile strength and abrasion resistance as when carbon black is incorporated thereinto, as well as a process for preparing the same.

Another object of the present invention is to provide a rubber composition containing a diene rubber and a reinforcing agent, and capable of yielding a vulcanized rubber which shows improvements in heat build-up, tensile strength, abrasion resistance and processability.

DISCLOSURE OF THE INVENTION

The present inventors have made intensive investigations with a view to overcoming the above-described problems of the prior art. As a result, it has now been discovered that a rubber composition which can yield a vulcanized rubber showing improvements in heat build-up, tensile strength and abrasion resistance and also has excellent processability can be obtained by using, as a rubber component, a diene rubber containing an amino-containing vinyl monomer and a hydroxyl-containing vinyl monomer as copolymeric components. The present invention has been completed on the basis of this discovery.

Thus, the present invention provides a diene rubber composed of 45 to 99.9% by weight of conjugated diene units, 0.05 to 20% by weight of amino-containing vinyl monomer units, 0.05 to 20% by weight of hydroxyl-containing vinyl monomer units, and 0 to 50% by weight of other copolymerizable monomer units, and having a Mooney viscosity ($ML_{1+4}$, 100° C.) of 10 to 200.

Moreover, the present invention also provides a process for preparing the aforesaid diene rubber which comprises copolymerizing a conjugated diene, an amino-containing vinyl monomer, a hydroxyl-containing vinyl monomer and another copolymerizable monomer.

Furthermore, the present invention also provides a rubber composition comprising a rubber component containing the aforesaid diene rubber, and a reinforcing agent.

Amino- and Hydroxyl-Containing Diene Rubber (i)

The diene rubber (i) of the present invention is essentially composed of conjugated diene units, amino-containing vinyl monomer units and hydroxyl-containing vinyl monomer units, and contains other copolymerizable monomer units as required.

Examples of the conjugated diene include 1,3-butadiene, 2-methyl-1,3-butadiene, 2,3-dimethyl-1,3-butadiene, 2-chloro-1,3-butadiene and 1,3-pentadiene. Among them, 1,3-butadiene and 2-methyl-1,3-butadiene are preferred, and 1,3-butadiene is more preferred. These conjugated dienes may be used alone or in admixture of two or more.

Usable amino-containing vinyl monomers are polymerizable monomers having, in the molecule, at least one amino group selected from primary, secondary and tertiary amino groups. Among them, tertiary amino-containing vinyl monomers are particularly preferred.

Examples of the primary amino-containing vinyl monomers include acrylamide, methacrylamide, p-aminostyrene, aminomethyl (meth)acrylate, aminoethyl (meth)acrylate, aminopropyl (meth)acrylate and aminobutyl (meth)acrylate.

Examples of the secondary amino-containing vinyl monomers include anilinostyrenes as disclosed in Japanese Patent Laid-Open No. 130355/'86; anilinophenylbutadienes as disclosed in Japanese Patent Laid-Open No. 130356/'86; and N-monosubstituted (meth)acrylamides such as N-methyl (meth)acrylamide, N-ethyl(meth)acrylamide, N-methylolacrylamide and N-(4-anilinophenyl) methacrylamide.

Examples of the tertiary amino-containing vinyl monomers include N,N-disubstituted aminoalkyl acrylates, N,N-disubstituted aminoalkylacrylamides, N,N-disubstituted amino aromatic vinyl compounds and pyridyl-containing vinyl compounds.

Examples of the N,N-disubstituted amino acrylates include N,N-dimethylaminomethyl (meth)acrylate, N,N-dimethylaminoethyl (meth)acrylate, N,N-dimethylaminopropyl (meth)acrylate, N,N-dimethylaminobutyl (meth)acrylate, N,N-diethylaminoethyl (meth)acrylate, N,N-diethylaminopropyl (meth)acrylate, N,N-diethylaminobutyl (meth)acrylate, N-methyl-N-ethylaminoethyl (meth)acrylate, N,N-dipropylaminoethyl (meth)acrylate, N,N-dibutylaminoethyl (meth)acrylate, N,N-dibutylaminopropyl (meth)acrylate, N,N-dibutylaminobutyl (meth)acrylate, N,N-dihexylaminoethyl (meth)acrylate and, N,N-dioctylaminoethyl (meth)acrylate. Among them, acrylic or methacrylic esters such as N,N-dimethylaminoethyl (meth)acrylate, N,N-diethylaminoethyl (meth)acrylate, N,N-dipropylaminoethyl (meth)acrylate, N,N-dioctylaminoethyl (meth)acrylate and N-methyl-N-ethylaminoethyl (meth)acrylate are preferred.

Examples of the N,N-disubstituted aminoalkyl acrylamides include acrylamide or methacrylamide compounds such as N,N-dimethylaminomethyl(meth)acrylamide, N,N-dimethylaminoethyl(meth)acrylamide, N,N-dimethylaminopropyl (meth)acrylamide, N,N-dimethylaminobutyl(meth)acrylamide, N,N-diethylaminoethyl(meth)acrylamide, N,N-diethylaminopropyl(meth)acrylamide, N,N-diethylaminobutyl(meth)acrylamide, N-methyl-N-ethylaminoethyl(meth)acrylamide, N,N-dipropylaminoethyl (meth)acrylamide, N,N-dibutylaminoethyl(meth) acrylamide, N,N-dibutylaminopropyl(meth)acrylamide, N,N-dibutylaminobutyl(meth)acrylamide, N,N-dihexylaminoethyl(meth)acrylamide, N,N-dihexylaminopropyl(meth)acrylamide and N,N-dioctylaminopropyl(meth)acrylamide. Among them, N,N-dimethylaminopropyl(meth)acrylamide, N,N-diethylaminopropyl(meth)acrylamide and N,N-dioctylaminopropyl(meth)acrylamide are preferred.

Examples of the N,N-disubstituted amino aromatic vinyl compounds include styrene derivatives such as N,N-dimethylaminoethylstyrene, N,N-diethylaminoethylstyrene, N,N-dipropylaminoethylstyrene and N,N-dioctylaminoethylstyrene.

Examples of the pyridyl-containing vinyl compounds include 2-vinylpyridine, 4-vinylpyridine, 5-methyl-2-vinylpyridine and 5-ethyl-2-vinylpyridine. Among them, 2-vinylpyridine and 4-vinylpyridine are preferred.

These amino-containing vinyl monomers may be used alone or in admixture of two or more.

Usable hydroxyl-containing vinyl monomers are polymerizable monomers having at least one primary, secondary or tertiary hydroxyl group in the molecule. These hydroxyl-containing vinyl monomers include, for example, hydroxyl-containing unsaturated carboxylic acid monomers, hydroxyl-containing vinyl ether monomers and hydroxyl-containing vinyl ketone monomers. Among them, hydroxyl-containing unsaturated carboxylic acid monomers are preferred. Examples of the hydroxyl-containing unsaturated carboxylic acid monomers include esters, amides and anhydrides (preferably esters) of acrylic acid, methacrylic acid, itaconic acid, fumaric acid and maleic acid. These hydroxyl-containing vinyl monomers may be used alone or in admixture of two or more.

Specific preferred examples of the hydroxyl-containing vinyl monomers include hydroxymethyl (meth)acrylate, 2-hydroxyethyl (meth)acrylate, 2-hydroxypropyl (meth) acrylate, 3-hydroxypropyl (meth)acrylate, 3-chloro-2-hydroxypropyl (meth)acrylate, 3-phenoxy-2-hydroxypropyl (meth)acrylate, glycerol mono(meth)acrylate, hydroxybutyl (meth)acrylate, 2-chloro-3-hydroxypropyl (meth)acrylate, hydroxyhexyl (meth)acrylate, hydroxyoctyl (meth)acrylate, hydroxymethyl(meth)acrylamide, 2-hydroxypropyl(meth) acrylamide, 3-hydroxypropyl(meth)acrylamide, di(ethylene glycol) itaconate, di(propylene glycol) itaconate, bis(2-hydroxypropyl) itaconate, bis(2-hydroxyethyl) itaconate, bis (2-hydroxyethyl) fumarate, bis(2-hydroxyethyl) maleate, 2-hydroxyethyl vinyl ether, hydroxymethyl vinyl ketone and allyl alcohol. Among them, hydroxymethyl (meth)acrylate, 2-hydroxyethyl (meth)acrylate, 2-hydroxypropyl (meth) acrylate, 3-hydroxypropyl (meth)acrylate, 3-phenoxy-2-hydroxypropyl (meth)acrylate, glycerol mono(meth) acrylate, hydroxybutyl (meth)acrylate, hydroxyhexyl (meth) acrylate, hydroxyoctyl (meth)acrylate, hydroxymethyl (meth)acrylamide, 2-hydroxypropyl(meth)acrylamide and 3-hydroxypropyl(meth)acrylamide are preferred.

These hydroxyl-containing vinyl monomers may be used alone or in admixture of two or more.

No particular limitation is placed on the type of the other copolymerizable monomer, provided that it does not defeat the objects of the present invention. However, when importance is attached to a balance between heat build-up and wet skid resistance, an aromatic vinyl is usually used. The aromatic vinyl is an aromatic vinyl compound neither amino group nor hydroxyl group. Examples thereof include styrene, α-methylstyrene, 2-methylstyrene, 3-methylstyrene, 4-methylstyrene, 2,4-diisoproylstyrene, 2,4-dimethylstyrene, 4-t-butylstyrene, 5-t-butyl-2-methylstyrene, monochlorostyrene, dichlorostyrene and monofluorostyrene. Among them, styrene is preferred.

These other copolymerizable monomers may be used alone or in admixture of two or more.

The presence or absence of other copolymerizable monomer units (in particular, aromatic vinyl units) in the copolymer may be suitably chosen according to the purpose of use.

Where particular importance is attached to heat build-up, there is used a copolymer composed of a conjugated diene, an amino-containing vinyl monomer and a hydroxyl-containing vinyl monomer. In this case, the content of each monomer is as follows: The content of conjugated diene units is in the range of 60 to 99.9% by weight, preferably 70 to 99.8% by weight, and more preferably 80 to 99.5% by weight; the content of amino-containing vinyl monomer units is in the range of 0.05 to 20% by weight, preferably 0.1 to 15% by weight, and more preferably 0.25 to 10% by weight; and the content of hydroxyl-containing vinyl monomer units is in the range of 0.05 to 20% by weight, preferably 0.1 to 15% by weight, and more preferably 0.25 to 10% by weight. If the content of the amino-containing vinyl monomer or the hydroxyl-containing vinyl monomer is unduly low, properties such as heat build-up, tensile strength and abrasion resistance will not be sufficiently improved. On the other hand, if it is unduly high, processability will be worsened and, moreover, properties such as heat build-up, tensile strength and abrasion resistance will not be sufficiently improved.

Where particular importance is attached to wet skid properties, it is preferable to use a copolymer composed of a conjugated diene, an amino-containing vinyl monomer, a hydroxyl-containing vinyl monomer, and another copolymerizable monomer (preferably an aromatic vinyl). In this case, the content of each monomer in the copolymer is as follows: The content of conjugated diene units is in the range of 45 to 94.9% by weight, preferably 50 to 89.8% by weight, and more preferably 55 to 84.5% by weight; the content of amino-containing vinyl monomer units is in the range of 0.05 to 20% by weight, preferably 0.1 to 15% by weight, and more preferably 0.25 to 10% by weight; the content of hydroxyl-containing vinyl monomer units is in the range of 0.05 to 20% by weight, preferably 0.1 to 15% by weight, and more preferably 0.25 to 10% by weight; and the content of other copolymerizable monomer (preferably aromatic vinyl) units is in the range of 5 to 50% by weight, preferably 10 to 45% by weight, and more preferably 15 to 40% by weight. If the content of the amino-containing vinyl monomer or the hydroxyl-containing vinyl monomer is unduly low, properties such as heat build-up, tensile strength and abrasion resistance will not be sufficiently improved. On the other hand, if it is unduly high, processability will be worsened and, moreover, properties such as heat build-up, tensile strength and abrasion resistance will not be sufficiently improved. If the content of the aromatic vinyl is unduly high, heat build-up will not be sufficiently improved.

The proportion of amino-containing vinyl monomer units to hydroxyl-containing vinyl monomer units in the aforesaid copolymers may be suitably chosen according to the intended purpose. However, the weight ratio of amino-containing vinyl monomer units to hydroxyl-containing vinyl monomer units is usually in the range of 5:95 to 90:10, preferably 10:90 to 80:20, and more preferably 15:85 to 70:30. When the contents of both types of monomer units are within this range, all properties including heat build-up, tensile strength, abrasion resistance and processability are suitably balanced on a high level.

In the present invention, a vinyl monomer having both an amino group and a hydroxyl group in the molecule [hereinafter referred to as the (amino+hydroxyl)-containing vinyl monomer] may also be used. Examples of the (amino+hydroxyl)-containing vinyl monomer include 2-dimethylamino-1-hydroxyethyl (meth)acrylate, 1-dimethylamino-2-hydroxyethyl (meth)acrylate, 3-dimethylamino-2-hydroxypropyl (meth)acrylate, 2-diethylamino-1-hydroxyethyl(meth)acrylamide, 3-dimethyl-amino-2-hydroxypropyl(meth)acrylamide and 2-hydroxy-4-N,N-dimethylaminoethyl styrene.

These (amino+hydroxyl)-containing vinyl monomers may be used alone or in admixture of two or more. The content of such a (amino+hydroxyl)-containing vinyl monomer is within the sum of the contents of the aforesaid amino-containing vinyl monomer and hydroxyl-containing vinyl monomer.

The diene rubber (i) of the present invention should have a Mooney viscosity ($ML_{1+4}$, 100° C.) of 10 to 200, preferably 20 to 150, and more preferably 25 to 120. If the Mooney viscosity is unduly low, the diene rubber will be poor in heat build-up and abrasion resistance. On the other hand, if it is unduly high, the diene rubber will be poor in processability.

In the diene rubber (i) of the present invention, no particular limitation is placed on the microstructure of the portions consisting of combined conjugated diene units, and the microstructure thereof may be suitably chosen according to the purpose of use. For example, the proportion of vinyl linkages (i.e., 1,2-vinyl and 3,4-vinyl linkages) in the portions consisting of combined conjugated diene units is usually in the range of 5 to 95%, preferably 7 to 50%, and more preferably 10 to 30%. When the proportion of vinyl linkages in the conjugated diene units is within this range, heat build-up properties and abrasion resistance are suitably balanced on a high level. In the portions consisting of combined conjugated diene units, the linkages other than vinyl linkages are 1,4-linkages, and they may be either cis-1,4-linkages or trans-1,4-linkages.

No particular limitation is placed on the process for preparing the diene rubber (i) of the present invention. For example, there may employed a process (P) which comprises copolymerizing a conjugated diene, an amino-containing vinyl monomer, a hydroxyl-containing vinyl monomer and optionally another copolymerizable monomer.

In the present invention, the amino-containing vinyl monomer may contain a hydroxyl group, and the hydroxyl-containing vinyl monomer may contain an amino group. Accordingly, the aforesaid process (P) may comprehend a process (P-a) which comprises copolymerizing a conjugated diene, an (amino+hydroxyl)-containing vinyl monomer, and optionally another copolymerizable monomer; a process (P-b) which comprises copolymerizing a conjugated diene, an amino-containing vinyl monomer having no hydroxyl group, an (amino+hydroxyl)-containing vinyl monomer, and another copolymerizable monomer; a process (P-c) which comprises copolymerizing a conjugated diene, a hydroxyl-containing vinyl monomer having no amino group, an (amino+hydroxyl)-containing vinyl monomer, and optionally another copolymerizable monomer; a process (P-d) which comprises copolymerizing a conjugated diene, an amino-containing vinyl monomer having no hydroxyl group, a hydroxyl-containing vinyl monomer having no amino group, an (amino+hydroxyl)-containing vinyl monomer, and optionally another copolymerizable monomer; and the like.

Although no particular limitation is placed on the technique for polymerization, emulsion polymerization is usually employed. For purposes of emulsion polymerization, any common emulsion polymerization process may be employed. One example thereof comprises emulsifying or dispersing predetermined amounts of the aforesaid monomers in an aqueous medium in the presence of an emulsifying agent and then effecting emulsion polymerization with the aid of a radical polymerization initiator. The amount of each monomer used may be suitably chosen so as to give the desired content of the monomer in the aforesaid diene rubber (i).

As the emulsifying agent, there may be used, for example, a long-chain fatty acid salt of 10 or more carbon atoms and/or a rosinate. Specific examples thereof include potassium and sodium salts of capric acid, lauric acid, myristic acid, palmitic acid, oleic acid and stearic acid.

Examples of the radical polymerization initiator include persulfuric acid salts such as ammonium persulfate and potassium persulfate; and redox initiators such as a combination of ammonium persulfate and ferric sulfate, a combination of an organic peroxide and ferric sulfate, and a combination of hydrogen peroxide and ferric sulfate.

Moreover, a chain transfer agent may be added in order to regulate the molecular weight of the copolymer. Usable chain transfer agents include, for example, mercaptans such as t-dodecylmercaptan and n-dodecylmercaptan, carbon tetrachloride, thioglycollic acid, diterpene, terpinolene and y-terpinenes.

The temperature for emulsion polymerization may be suitably chosen according to the type of the radical polymerization initiator used. However, it is usually in the range of 0 to 100° C. and preferably 0 to 60° C. The manner of polymerization may be either continuous polymerization or batch polymerization.

As the degree of conversion in emulsion polymerization becomes higher, the polymerization mixture tends to undergo gelation. Consequently, the degree of conversion is preferably controlled so as to be not greater than 80%. It is especially preferable to stop the polymerization at a degree of conversion in the range of 40 to 70%. The polymerization reaction is usually stopped by adding a polymerization stopper to the polymerization system when a predetermined degree of conversion is reached. Usable polymerization stoppers include, for example, amine compounds such as diethylhydroxylamine and hydroxylamine; quinone compounds such as hydroquinone and benzoquinone; and other compounds such as sodium nitrite and sodium dithiocarbamate.

After the polymerization reaction is stopped, unreacted monomers are removed from the resulting polymer latex as required, and the pH of the latex is adjusted to a predetermined value as required by the addition of an acid such as nitric acid or sulfuric acid. Thereafter, a coagulant comprising a salt such as sodium chloride, calcium chloride or potassium chloride is added to and mixed with the latex to coagulate and recover the polymer in the form of crumbs. These crumbs are washed, dehydrated and then dried with a band dryer or the like. Thus, the desired amino- and hydroxyl-containing diene rubber can be obtained.

Rubber Component

In the rubber compositions of the present invention, a rubber component containing the aforesaid diene rubber (i) is used. The proportion of the diene rubber (i) in the rubber component may be suitably chosen according to the purpose of use. However, it is usually not less than 10% by weight, preferably in the range of 15 to 100% by weight, more preferably 20 to 100% by weight, and most preferably 25 to 100% by weight. If the proportion of the diene rubber (i) of the present invention in the rubber component is unduly low, a sufficient improvement in properties will not be achieved.

No particular limitation is placed on the type of other rubbers which can be used in combination. However, diene rubbers are usually used. Examples of the diene rubbers include natural rubber (NR), polyisoprene rubber (IR), emulsion-polymerized styrene-butadiene copolymer rubber (SBR), solution-polymerized random SBR (containing 5 to 50% by weight of bound styrene and having a 1,2-vinyl linkage content of 10 to 80% in the portions consisting of combined butadiene units), high-trans SBR (having a 1,4-trans-linkage content of 70 to 95% in the portions consisting of combined butadiene units), low-cis polybutadiene rubber (BR), high-cis BR, high-trans BR (having a 1,4-trans-linkage content of 70 to 95% in the portions consisting of combined butadiene units), styrene-isoprene copolymer rubber (SIR), butadiene-isoprene copolymer rubber, solution-polymerized random styrene-butadiene-isoprene copolymer rubber (SIBR), emulsion-polymerized SIBR, emulsion-polymerized styrene-acrylonitrile-butadiene copolymer rubber, acrylonitrile-butadiene copolymer rubber, high-vinyl SBR/low-vinyl SBR block copolymer rubber, and polystyrene-polybutadiene-polystyrene block copolymer, and they may be suitably chosen according to the desired properties. Among them, NR, BR, IR, SBR and SIBR are preferred. These other rubbers may be used alone or in admixture of two or more.

Reinforcing Agent

No particular limitation is placed on the type of the reinforcing agent. For example, silica and carbon black may be used.

No particular limitation is placed on the type of silica. Examples thereof include dry process white carbon, wet process white carbon, colloidal silica, and precipitated silica as disclosed in Japanese Patent Laid-Open No. 62838/'87. Among them, wet process white carbon consisting essentially of hydrated silica is particularly preferred. These silicas may be used alone or in admixture of two or more.

No particular limitation is placed on the specific surface area of silica. However, the nitrogen adsorption specific surface area (measured by the BET method) of silica should usually be in the range of 50 to 400 $m^2/g$, preferably 100 to 250 $m^2/g$, and more preferably 120 to 190 $m^2/g$, because sufficient improvements in reinforcing power, abrasion resistance and heat build-up are achieved in such a case. The nitrogen adsorption specific surface area is a value measured by the BET method according to ASTM D3037-81.

No particular limitation is placed on the type of carbon black. However, usable carbon blacks include furnace black, acetylene black, thermal black, channel black and graphite. Among them, furnace black is particular preferred. Specific examples thereof include products of various grades such as SAF, ISAF, ISAF-HS, ISAF-LS, IISAF-HS, HAF, HAF-HS, HAF-LS and FEF. These carbon blacks may be used alone or in admixture of two or more.

No particular limitation is placed on the specific surface area of carbon black. However, when its nitrogen adsorption specific surface area ($N_2SA$) is in the range of 5 to 200 $m^2/g$, preferably 50 to 150 $m^2/g$, and more preferably 80 to 130 $m^2/g$, tensile strength and abrasion resistance are improved to a high degree. Moreover, no particular limitation is placed on the DBP adsorption level of carbon black. However, when it is in the range of 5 to 300 ml/100 g, preferably 50 to 200 ml/100 g, and more preferably 80 to 160 ml/100 g, tensile strength and abrasion resistance are improved to a high degree.

Abrasion resistance can further be improved by using high-structure carbon black which is disclosed in Japanese Patent Laid-Open No. 230290/'93 and characterized by a cetyltrimethylammonium bromide (CTAB) adsorption specific surface area of 110 to 170 m²/g and a DBP (24M4DBP) oil absorption of 110 to 130 ml/100 g after being repeatedly compressed four times under a pressure of 24,000 psi.

The amount of reinforcing agent used is in the range of 10 to 200 parts by weight, preferably 20 to 150 parts by weight, and more preferably 30 to 120 parts by weight, per 100 parts by weight of the rubber component.

In order to accomplish the objects of the present invention to the fullest extent, it is preferable to use, as the reinforcing agent, silica alone or a combination of silica and carbon black. When a combination of silica and carbon black is used, the mixing ratio thereof may be suitably chosen according to the intended application or purpose. However, the weight ratio of silica to carbon black is usually in the range of 10:90 to 99:1, preferably 30:70 to 95:5, and more preferably 50:50 to 90:10.

Silane Coupling Agent

In the present invention, the addition of a silane coupling agent is preferable because this brings about further improvements in heat build-up and abrasion resistance.

No particular limitation is placed on the type of the silane coupling agent. Examples thereof include vinyltrichlorosilane, vinyltriethoxysilane, vinyltris(β-methoxyethoxy)silane, β-(3,4-epoxycyclohexyl) ethyltrimethoxysilane, γ-glycidoxypropyltrimethoxysilane, γ-methacryloxypropyltrimethoxysilane, N-β-(aminoethyl)-γ-aminopropyltrimethoxysilane, N-β-(aminoethyl)-γ-aminopropylmethyldimethoxysilane, N-phenyl-γ-aminopropyltrimethoxysilane, γ-chloropropyltrimethoxysilane, γ-mercaptopropyltrimethoxysilane, γ-aminopropyltriethoxysilane and bis[3-(triethoxysilyl) propyl] tetrasulfide, as well as the tetrasulfides described in Japanese Patent Laid-Open No. 248116/'94, including γ-trimethoxysilylpropyl dimethylthiocarbamyl tetrasulfide and γ-trimethoxysilylpropyl benzothiazyl tetrasulfide.

These silane coupling agents may be used alone or in admixture of two or more. The amount of silane coupling agent used is usually in the range of 0.1 to 30 parts by weight, preferably 1 to 20 parts by weight, and more preferably 2 to 10 parts by weight, per 100 parts by weight of silica.

Rubber Compositions

In the usual manner, the rubber compositions of the present invention may contain, in addition to the above-described components, desired amounts of other compounding ingredients such as vulcanizing agents, vulcanization accelerators, vulcanization activators, antioxidants, activators, plasticizers, lubricants and fillers.

No particular limitation is placed on the type of the vulcanizing agent. Examples thereof include sulfur such as powdered sulfur, precipitated sulfur, colloidal sulfur, insoluble sulfur and highly dispersible sulfur; sulfur halides such as sulfur monochloride and sulfur dichloride; organic peroxides such as dicumyl peroxide and di-tert-butyl peroxide; quinone dioximes such as p-quinone dioxime and p,p'-dibenzoylquinone dioxime; organic multivalent amine compounds such as triethylenetetramine, hexamethylenediamine carbamate and 4,4'-methylenebis-o-chloroaniline; and alkylphenol resins having methylol groups. Among them, sulfur is preferred, and powdered sulfur is particularly preferred. These vulcanizing agents may be used alone or in admixture of two or more.

The amount of vulcanizing agent used is usually in the range of 0.1 to 15 parts by weight, preferably 0.3 to 10 parts by weight, and more preferably 0.5 to 5 parts by weight, per 100 parts by weight of the rubber component. When the amount of vulcanizing agent used is in this range, there can be obtained a vulcanized product which is excellent not only in tensile strength and abrasion resistance, but also in properties such as heat resistance and residual strain.

Usable vulcanization accelerators include, for example, sulfenamide type vulcanization accelerators such as N-cyclohexyl-2-benzothiazole sulfenamide, N-t-butyl-2-benzothiazole sulfenamide, N-oxyethylene-2-benzothiazole sulfenamide, N-oxyethylene-2-benzothiazole sulfenamide and N,N'-diisopropyl-2-benzothiazole sulfenamide; guanidine type vulcanization accelerators such as diphenylguanidine, di-o-tolylguanidine and o-tolylbiguanidine; thiourea type vulcanization accelerators such as thiocarbanilide, di-o-tolylthiourea, ethylenethiourea, diethylthiourea and trimethylthiourea; thiazole type vulcanization accelerators such as 2-mercaptobenzothiazole, dibenzothiazyl disulfide, 2-mercaptobenzothiazole zinc salt, 2-mercaptobenzothiazole sodium salt, 2-mercaptobenzothiazole cyclohexylamine salt and 2-(2,4-dinitrophenylthio)benzothiazole; thiuram type vulcanization accelerators such as tetramethylthiuram monosulfide, tetramethylthiuram disulfide, tetraethylthiuram disulfide, tetrabutylthiuram disulfide and dipentamethylenethiuram tetrasulfide; dithiocarbamate type vulcanization accelerators such as sodium dimethyidithiocarbamate, sodium diethyidithiocarbamate, sodium di-n-butyldithiocarbamate, lead dimethyldithiocarbamate, zinc dimethyidithiocarbamate, zinc diethyidithiocarbamate, zinc di-n-butyidithiocarbamate, zinc pentamethylenedithiocarbamate, zinc ethylpheny (dithiocarbamate, tellurium diethyldithiocarbamate, selenium dimethyldithiocarbamate, selenium diethyldithiocarbamate, copper dimethyldithiocarbamate, iron dimethyldithiocarbamate, diethyidithiocarbamic acid diethylamine salt, pentamethylenedithiocarbamic acid piperidine salt and methylpentamethylenedithiocarbamic acid pipecoline salt; and xanthogenate type vulcanization accelerators such as sodium isopropylxanthogenate, zinc isopropylxanthogenate and zinc butylxanthogenate.

These vulcanization accelerators may be used alone or in admixture of two or more. However, it is especially preferable to use a vulcanization accelerator containing at least a sulfenamide vulcanization accelerator. The amount of vulcanization accelerator used is usually in the range of 0.1 to 15 parts by weight, preferably 0.3 to 10 parts by weight, and more preferably 0.5 to 5 parts by weight, per 100 parts by weight of the rubber component.

No particular limitation is placed on the type of the vulcanizing accelerator. For example, higher fatty acids (e.g., stearic acid) and zinc oxide may be used. In the case of zinc oxide, it is preferable to use zinc oxide having a particle size of, for example, not greater than 5 μm and hence high surface activity. Specific examples thereof include active zinc flour having a particle size of, for example, 0.05 to 0.2 μm and zinc white having a particle size of, for example, 0.3 to 1 μm. Moreover, zinc oxide treated with an amine type dispersing agent or wetting agent may also be used.

These vulcanization activators may be used alone or in admixture of two or more. The amount of vulcanization activator used may be suitably chosen according to the type of the vulcanization activator. When a higher fatty acid is used, its amount used is usually in the range of 0.05 to 15 parts by weight, preferably 0.1 to 10 parts by weight, and more preferably 0.5 to 5 parts by weight, per 100 parts by weight of the rubber component. When zinc oxide is used, its amount used is usually in the range of 0.05 to 10 parts by weight, preferably 0.1 to 5 parts by weight, and more preferably 0.5 to 2 parts by weight, per 100 parts by weight of the rubber component. When the amount of zinc oxide used is in this range, properties such as processability, tensile strength and abrasion resistance are suitably balanced on a high level.

Examples of other compounding ingredients include coupling agents other than silane coupling agents; activators such as diethylene glycol, polyethylene glycol and silicone oil; fillers such as calcium carbonate, talc and clay; process oils; and waxes.

The rubber compositions of the present invention can be obtained by kneading a mixture of various ingredients in the usual manner. For example, the rubber compositions can be obtained by mixing the rubber component with compounding ingredients other than the vulcanizing agent and the vulcanization accelerator, and then kneading the resulting mixture with the vulcanizing agent and the vulcanization accelerator. More specifically, the rubber compositions can be obtained, for example, in the following manner. The rubber component is usually mixed with compounding ingredients other than the vulcanizing agent and the vulcanization accelerator, at a temperature of 80 to 200° C., preferably 100 to 190° C., and more preferably 140 to 180° C. for a period of not less than 30 seconds and preferably 1 to 30 minutes. After the resulting mixture is usually cooled to a temperature of 100° C. or below and preferably ranging from room temperature to 80° C., the vulcanizing agent and the vulcanization accelerator are added thereto and kneaded. Thereafter, the rubber compositions thus obtained may usually be press-cured at a temperature of 120 to 200° C. and preferably 140 to 180° C. to obtain vulcanized rubbers.

Best Mode for Carrying Out the Invention

The present invention is more specifically explained with reference to the following preparation examples, examples and comparative examples. In these examples, all parts and percentages are by weight unless otherwise stated.

Various properties were measured according to the following methods.

(1) The content of combined styrene in a polymer was determined according to JIS K6383 (the refractive index method).

(2) The proportion of vinyl linkages in the combined butadiene units of a polymer was determined by infrared spectroscopy (the Hampton method).

(3) The content of an amino-containing monomer in a polymer was determined by dissolving the copolymer in tetrahydrofuran, subjecting this solution twice to a reprecipitation/coagulation treatment with methanol/acetone (50/50 mole %), drying the resulting precipitate in vacuo, and analyzing it by 500 MHz $^1$H-NMR.

(4) The content of a hydroxyl-containing monomer in a polymer was determined according to the method described in Japanese Patent Laid-Open No. 174408/'91. That is, this was estimated by treating the polymer with phenyl isocyanate and analyzing the phenyl groups from phenyl isocyanate quantitatively by $^{13}$C-NMR spectroscopy.

(5) Mooney viscosity ($ML_{1+4}$, 100° C.) was measured according to JIS K6301.

(6) As to tensile strength, 300% stress (in $Kgf/cm^2$) was measured according to JIS K6301.

(7) As to heat build-up, tan δ at 1% torsion, 20 Hz and 60° C. was measured with an RDA-II (manufactured by Rheometrics Co.). This property was expressed in terms of an index number (i.e., tan δ 60° C. index).

(8) Abrasion resistance was measured with a pico abrasion tester according to ASTM D2228. This property was expressed in terms of an index number (i.e., abrasion resistance index).

(9) Processability was evaluated by observing the manner of winding around rolls and rating it on the following basis.

4: The rubber composition winds around the rolls neatly.

3: The rubber composition lifts up slightly.

2: The rubber composition winds around the rolls, but lifts up frequently.

1: The rubber composition scarcely winds around the rolls.

Preparation Examples 1–5

A tank fitted with a stirrer was charged with 200 parts of water, 3 parts of rosin soap, 0.15 part of t-dodecyl mercaptan, and each of the monomer compositions shown in Table 1. While the temperature of the reactor was maintained at 5 C, polymerization was initiated by the addition of a radical polymerization initiator comprising 0.1 part of cumene hydroperoxide, 0.2 part of sodium formaldehyde sulfoxylate and 0.01 part of ferric sulfate. When the degree of conversion reached 60%, the reaction was stopped by the addition of diethylhydroxylamine. After unreacted monomers were recovered, the resulting polymer was coagulated as crumbs by the addition of sulfuric acid and sodium chloride, and then dried with a crumb dryer. Thus, diene rubber Nos. 1–5 were obtained. Properties of these diene rubbers are shown in Table 1.

TABLE 1

| Diene rubber No. | 1 | 2 | 3 | 4 | 5 |
|---|---|---|---|---|---|
| Amount charged (parts) | | | | | |
| Butadiene | 53.0 | 55.0 | 54.0 | 55.0 | 58.0 |
| Styrene | 40.0 | 42.0 | 42.0 | 40.0 | 42.0 |
| DMAST (*1) | 2.0 | — | — | — | — |
| DMAPAA (*2) | — | 1.0 | — | 5.0 | — |
| 2VP (*3) | — | — | 2.0 | — | — |

TABLE 1-continued

| Diene rubber No. | 1 | 2 | 3 | 4 | 5 |
|---|---|---|---|---|---|
| HEMA (*4) | 5.0 | 2.0 | — | — | — |
| HEA (*5) | — | — | 2.0 | — | — |
| Content (wt. %) | | | | | |
| Styrene | 32.9 | 34.5 | 34.1 | 32.5 | 34.3 |
| Amino-containing monomer | 1.6 | 0.5 | 2.2 | 5.5 | — |
| OH-containing monomer | 5.9 | 2.4 | 2.8 | — | — |
| Mooney viscosity ($ML_{1+4, 100°C.}$) | 50 | 51 | 54 | 52 | 58 |

(*1) p-Dimethylaminomethylstyrene.
(*2) N,N-Dimethylaminopropylacrylamide.
(*3) 2-Vinylpyridine.
(*4) Hydroxyethyl methacrylate.
(*5) Hydroxyethyl acrylate.

Examples 1–5 and Comparative Example 1

Each of diene rubber Nos. 1–5 prepared in the foregoing Preparation Examples was used as raw rubber. According to Formulation 1 shown in Table 2, all of the raw rubber, half of silica, half of the silane coupling agent, and stearic acid were mixed at 170° C. for 2 minutes in a Brabender type mixer having a capacity of 250 ml. Then, the remaining compounding ingredients, except sulfur and the vulcanization accelerator, were added and this mixture was kneaded at the same temperature for 3 minutes. Subsequently, the resulting mixture, sulfur and the vulcanization accelerator were added to an open roll mill kept at 50° C., and kneaded therein. Thereafter, specimens were prepared by press curing at 160° C. for 30 minutes and used to measure various properties. The results thus obtained are shown in Table 3.

TABLE 2

| Formulation 1 | First time | Second time | Third time |
|---|---|---|---|
| Raw rubber | All | — | — |
| Silica | 40 | 40 | — |
| Silane coupling agent (*1) | 3.2 | 3.2 | — |
| Aromatic oil | — | 30 | — |
| Stearic acid | 2 | — | — |
| Zinc oxide (*2) | — | Variable | — |
| Antioxidant (*3) | — | 1 | — |
| Sulfur | — | — | 2 |
| Vulcanization accelerator (*4) | — | — | 3.5 |

(*1) Si 69 (manufactured by Degussa Co.).
(*2) Zinc Oxide #1 (manufactured by Honsho Chemical Co., Ltd.; particle size = 0.4 μm).
(*3) Nocrak 6C (manufactured by Oouchi Shinko Co., Ltd.).
(*4) Nocceler CZ (manufactured by Oouchi Shinko Co., Ltd.).

TABLE 3

| | Example | | | | | Comparative Example |
|---|---|---|---|---|---|---|
| | 1 | 2 | 3 | 4 | 5 | 1 |
| Rubber component (parts) | | | | | | |
| Diene rubber No. 1 | 100 | — | — | — | — | — |
| Diene rubber No. 2 | — | 100 | 100 | 100 | — | — |
| Diene rubber No. 3 | — | — | — | — | 100 | — |
| Diene rubber No. 4 | — | — | — | — | — | 100 |
| Compounding ingredients (parts) | | | | | | |
| Silica (*1) | 80 | 80 | 80 | — | 80 | — |
| Silica (*2) | — | — | — | 80 | — | 80 |
| Zinc oxide | 1.5 | 1.5 | 3 | 3 | 1.5 | 3 |
| 300% stress (Kgf/cm$^2$) | 135 | 152 | 142 | 130 | 142 | 114 |
| tan δ 60° C. index (*3) | 113 | 133 | 126 | 121 | 128 | 100 |
| Abrasion resistance index (*3) | 124 | 138 | 131 | 122 | 132 | 100 |
| Processability | 4 | 4 | 4 | 4 | 4 | 1 |

(*1) Z1165 MP (manufactured by Rhone-Poulenc Co.; nitrogen adsorption specific surface area = 175 m$^2$/g).
(*2) Nipsil VN3 (manufactured by Nippon Silica Co., Ltd.; nitrogen adsorption specific surface area = 240 m$^2$/g).
(*3) These indices are expressed by taking the values of Comparative Example 1 as 100.

It can be seen from the results shown in Table 3 that, in the rubber compositions of the present invention (Examples 1–5), all properties including tensile strength, heat build-up, abrasion resistance and processability are markedly improved as compared with the rubber composition using a diene rubber containing amino groups alone (Comparative Example 1). Moreover, it can also be seen that tensile strength, heat build-up and abrasion resistance are further improved by using silica having a small specific surface area (by comparison of Examples 3 and 4) and that these properties (i.e., tensile strength, heat build-up and abrasion resistance) are further improved by using a limited amount of zinc oxide (by comparison of Examples 2 and 3).

Examples 6–9 and Comparative Example 2

Using each of the raw rubbers shown in Table 5, the following procedure was performed according to Formulation 2 shown in Table 4. First of all, all of the raw rubber, half of silica, half of the silane coupling agent, and stearic acid were mixed at 170° C. for 2 minutes in a Brabender type mixer having a capacity of 250 ml. Then, the remaining compounding ingredients, except sulfur and the vulcanization accelerator, were added and this mixture was kneaded at the same temperature for 2.5 minutes. Subsequently, the resulting mixture, sulfur and the vulcanization accelerator were added to an open roll mill kept at 50° C., and kneaded therein. Thereafter, specimens were prepared by press curing at 160° C. for 30 minutes and used to measure various properties. The results thus obtained are shown in Table 5.

TABLE 4

| Formulation 2 | First time | Second time | Third time |
|---|---|---|---|
| Raw rubber | All | — | — |
| Silica (*1) | Half | Half | — |
| Carbon black (*2) | — | All | — |
| Silane coupling agent (*3) | Half | Half | — |
| Aromatic oil | — | 25 | — |

TABLE 4-continued

| Formulation 2 | First time | Second time | Third time |
|---|---|---|---|
| Stearic acid | 2 | — | — |
| Zinc oxide (*4) | — | 1.5 | — |
| Antioxidant (*5) | — | 1 | — |
| Sulfur | — | — | 2 |
| Vulcanization accelerator (*6) | — | — | 3.5 |

(*1) Z1165 MP.
(*2) Seast KH (manufactured by Tokai Carbon Co.; Ltd.).
(*3) Si 69.
(*4) Zinc Oxide #1.
(*5) Nocrak 6C.
(*6) Nocceler CZ.

TABLE 5

| | Example | | | | Comparative Example |
|---|---|---|---|---|---|
| | 6 | 7 | 8 | 9 | 2 |
| Rubber component (parts) | | | | | |
| Diene rubber No. 3 | 100 | 80 | 60 | 40 | — |
| Diene rubber No. 5 | — | — | — | — | 80 |
| BR 1220 (*1) | — | 20 | 40 | — | 20 |
| Natural rubber (*2) | — | — | — | 60 | — |
| Compounding ingredients (parts) | | | | | |
| Silane coupling agent | 4.0 | 6.4 | 6.4 | 6.4 | 6.4 |
| Silica | 50 | 80 | 80 | 80 | 80 |
| Carbon black | 30 | — | — | — | — |
| Zinc oxide | 1.5 | 1.5 | 1.5 | 1.5 | 1.5 |
| 300% stress (Kgf/cm$^2$) | 156 | 144 | 127 | 153 | 98 |
| tan δ 60° C. index (*3) | 132 | 136 | 138 | 127 | 100 |
| Abrasion resistance index (*3) | 142 | 138 | 146 | 151 | 100 |
| Processability | 4 | 4 | 3 | 4 | 4 |

(*1) Polybutadiene (manufactured by Nippon Zeon Co., Ltd.).
(*2) RSS No. 3.
(*3) These indices are expressed by taking the values of Comparative Example 2 as 100.

Various embodiments of the present invention are given below.

(1) A diene rubber composed of 40 to 99.9% by weight of conjugated diene units, 0.05 to 20% by weight of amino-containing vinyl monomer units, 0.01 to 20% by weight of hydroxyl-containing vinyl monomer units, and 0 to 50% by weight of other copolymerizable monomer units, and having a Mooney viscosity ($ML_{1+4}$, 100° C.) of 10 to 200.

(2) A diene rubber as described in (1) wherein the proportion of vinyl linkages in the portions consisting of combined conjugated diene units is in the range of 5 to 95%.

(3) A diene rubber as described in (1) or (2) wherein the ratio of amino-containing vinyl monomer units to hydroxyl-containing vinyl monomer units is in the range of 5:95 to 90:10.

(4) A diene rubber as described in any of (1) to (3) wherein the amino group of the amino-containing vinyl monomer is a tertiary amino group.

(5) A diene rubber as described in (4) wherein the tertiary amino-containing vinyl monomer is an N,N-disubstituted aminoalkyl acrylate, an N,N-disubstituted aminoalkylacrylamide, an N,N-disubstituted amino aromatic vinyl compound or a pyridyl-containing vinyl compound.

(6) A diene rubber as described in any of (1) to (5) wherein the hydroxyl-containing vinyl monomer is a hydroxyl-containing unsaturated carboxylic acid monomer, a hydroxyl-containing vinyl ether monomer or a vinyl ketone monomer, and preferably a hydroxyl-containing unsaturated carboxylic acid monomer.

(7) A diene rubber as described in (6) wherein in the hydroxyl-containing unsaturated carboxylic acid monomer is a hydroxyl-containing unsaturated carboxylic acid ester, a hydroxyl-containing unsaturated carboxylic acid amide or a hydroxyl-containing unsaturated carboxylic acid anhydride.

(8) A diene rubber as described in (6) or (7) wherein the unsaturated carboxylic acid is acrylic acid, methacrylic acid, itaconic acid, fumaric acid or maleic acid, and preferably acrylic acid or methacrylic acid.

(9) A process for preparing a diene rubber which comprises copolymerizing a conjugated diene, an amino-containing vinyl monomer and a hydroxyl-containing vinyl monomer, or copolymerizing a conjugated diene, an amino-containing vinyl monomer, a hydroxyl-containing vinyl monomer and another copolymerizable monomer.

(10) A process for preparing a diene rubber which comprises copolymerizing an amino- and hydroxyl-containing vinyl monomer and a conjugated diene, or copolymerizing an amino- and hydroxyl-containing vinyl monomer, a conjugated diene and another copolymerizable monomer.

(11) A process for preparing a diene rubber as described in (9) or (10) wherein the polymerization technique is emulsion polymerization.

(12) A rubber composition comprising a rubber component and a reinforcing agent, the rubber component containing a diene rubber as described in any of (1) to (8).

(13) A rubber composition as described in (12) wherein the proportion of the diene rubber in the rubber component is not less than 10% by weight.

(14) A rubber composition as described in (12) or (13) wherein the reinforcing agent is used in an amount of 10 to 200 parts by weight per 100 parts by weight of the rubber component.

(15) A rubber composition as described in any of (12) to (14) wherein the reinforcing agent is carbon black.

(16) A rubber composition as described in any of (12) to (14) wherein the reinforcing agent contains silica.

(17) A rubber composition as described in (16) wherein the silica is dry process white carbon, wet process white carbon, colloidal silica or precipitated silica.

(18) A rubber composition as described in (16) or (18) wherein the nitrogen adsorption specific surface area (measured by the BET method) of silica is in the range of 50 to 400 m$^2$/g.

(19) A rubber composition as described in any of (16) to (18) which further contains a silane coupling agent.

(20) A rubber composition as described in (19) wherein the silane coupling agent is used in an amount of 0.1 to 30 parts by weight per 100 parts by weight of silica.

(21) A rubber composition as described in (12) to (20) which further contains a vulcanizing agent, a vulcanization accelerator and a vulcanization activator.

(22) A rubber composition as described in (21) which contains 0.1 to 15 parts by weight of the vulcanizing agent and 0.1 to 15 parts by weight of the vulcanization accelerator per 100 parts by weight of the rubber component.

(23) A rubber composition as described in (21) or (22) wherein the vulcanization accelerator contains at least a sulfenamide type vulcanization accelerator.

(24) A rubber composition as described in any of (21) to (23) which contains zinc oxide as the vulcanization activator.

(25) A rubber composition as described in (24) wherein the particle size of zinc oxide is not greater than 5 μm.

(26) A rubber composition as described in (24) or (25) wherein zinc oxide is used in an amount of 0.05 to 10 parts by weight per 100 parts by weight of the rubber component.

(27) A diene rubber, process or rubber composition as described in any of (1) to (26) wherein the other copolymerizable monomer is an aromatic vinyl.

(28) A diene rubber, process or rubber composition as described in (27) wherein the aromatic vinyl is styrene.

(29) A diene rubber, process or rubber composition as described in any of (1) to (28) wherein the conjugated diene is butadiene or isoprene.

Exploitability in Industry

The diene rubbers of the present invention can yield vulcanized rubbers having excellent processability and, when silica is used as the reinforcing agent, having not only improved heat build-up but also improved tensile strength and abrasion resistance. Accordingly, the diene rubbers and rubber compositions of the present invention are useful in various applications making the most of their properties. For example, they can be used as materials for forming various parts of tires, such as tread, carcass, sidewalls and beads; for rubber products such as hoses, window frames, belts, shoe soles, rubber vibration isolators and automobile parts; and as reinforcing rubbers for resins such as impact-resistant polystyrene and ABS resin. In particular, they are highly useful for the tire treads of, for example, low-fuel-consumption tires, all-season tires, high-performance tires and studless tires.

What is claimed is:

1. A diene rubber comprising 45 to 99.9% by weight of repeating units of at least one conjugated diene, 0.05 to 20% by weight of repeating units of at least one vinyl monomer selected from the group consisting of primary amino-containing vinyl monomers, anilinostyrene, anilinophenyl-butadiene, N-monosubstituted acrylamides, N-monosubstituted methacrylamides, N,N-disubstituted aminoalkylacrylates, N,N-disubstituted aminoalkylacrylamides, N,N-disubstituted amino aromatic vinyl compounds, and pyridyl-containing vinyl compounds, 0.05 to 20% by weight of repeating units of at least one hydroxyl-containing vinyl monomer selected from the group consisting of
hydroxyl-containing unsaturated carboxylic acid ester monomers,
hydroxyl-containing unsaturated carboxylic acid amide monomers,
hydroxyl-containing unsaturated carboxylic acid anhydride monomers,
hydroxyl-containing vinyl ether monomers,
hydroxyl-containing vinyl ketone monomers, and
allyl alcohol monomer, and 0 to 50% by weight of repeating units of at least one other copolymerizable monomer, and having a Mooney viscosity ($ML_{1+4}$, 100° C.) of 10 to 200.

2. A diene rubber as claimed in claim 1, wherein the vinyl monomer unit comprises at least one member selected from the group consisting of N,N-disubstituted aminoalkylacrylate units, N,N-disubstituted aminoalkylacrylamide units, N,N-disubstituted amino aromatic vinyl compound units and pyridyl-containing vinyl compound units.

3. A diene rubber as claimed in claim 1 or claim 2, wherein the repeating units of said at least one hydroxyl-containing vinyl monomer comprise at least one of said hydroxyl-containing acid ester, acid amide or acid anhydride monomers, alone or in combination with said hydroxyl-containing vinyl ether monomer, said hydroxyl-containing vinyl ketone monomer or allyl alcohol monomer.

4. A diene rubber as claimed in claim 1 or claim 2, wherein the other copolymerizable monomer comprises an aromatic vinyl.

5. A diene rubber as claimed in claim 1 which comprises units of at least the following (a), (b) and (c) and, optionally, (d):

(a) units of 1,3-butadiene, 2-methyl-1,3-butadiene, 2,3-dimethyl-1,3-butadiene, 2-chloro-1,3-butadiene, 1,3-pentadiene or mixtures thereof;

(b) units of at least one of (i) primary amino-containing vinyl monomer selected from the group consisting of acrylamide, methacrylamide, p-aminostyrene, aminomethyl (meth)acrylate, aminoethyl (meth)acrylate, aminopropyl (meth)acrylate, and aminobutyl (meth)acrylate; (ii) secondary amino-containing vinyl monomer selected from the group consisting of anilinostyrenes, anilinophenyl butadienes, and N-monosubstituted (meth)acrylamides; (iii) tertiary amino-containing vinyl monomers selected from the group consisting of N,N-dimethylaminomethyl (meth)acrylate, N,N-dimethylaminoethyl (meth)acrylate, N,N-dimethylaminopropyl (meth)acrylate, N,N-dimethylaminobutyl (meth)acrylate, N,N-diethylaminoethyl (meth)acrylate, N,N-diethylaminopropyl (meth)acrylate, N,N-diethylaminobutyl (meth)acrylate, N-methyl-N-ethylaminoethyl (meth)acrylate, N,N-dipropylaminoethyl (meth)acrylate, N,N-dibutylaminoethyl (meth)acrylate, N,N-dibutylaminopropyl (meth)acrylate, N,N-dibutylaminobutyl (meth)acrylate, N,N-dihexylaminoethyl (meth)acrylate, N,N-dioctylaminoethyl (meth)acrylate, N,N-dimethylaminomethyl (meth)acrylamide, N,N-dimethylaminoethyl (meth)acrylamide, N,N-dimethylaminopropyl (meth)acrylamide, N,N-dimethylaminobutyl (meth)acrylamide, N,N-diethylaminoethyl (meth)acrylamide, N,N-diethylaminopropyl (meth)acrylamide, N,N-diethylaminobutyl (meth)acrylamide, N-methyl-N-ethylaminoethyl (meth)acrylamide, N,N-dipropylaminoethyl (meth)acrylamide, N,N-dibutylaminoethyl (meth)acrylamide, N,N-dibutylaminopropyl (meth)acrylamide, N,N-dibutylaminobutyl (meth)acrylamide, N,N-dihexylaminoethyl (meth)acrylamide, N,N-dihexylaminopropyl (meth)acrylamide, N,N- dioctylaminopropyl (meth)acrylamide, N,N-dimethylaminoethylstyrene, N,N-diethylaminoethylstyrene, N,N-dipropylaminoethylstyrene, and N,N-dioctylaminoethylstyrene; and (iv) 2-vinylpyridine, 4-vinylpyridine, 5-methyl-2-vinylpyridine and 5-ethyl-2-vinylpyridine;

(c) units of at least one hydroxyl-containing vinyl monomer selected from the group consisting of amides, esters and anhydrides of unsaturated carboxylic acids selected from the group consisting of acrylic acid, methacrylic acid, itaconic acid, fumaric acid and maleic acid; and, optionally, (d) units of at least one other copolymerizable aromatic vinyl compound.

6. A diene rubber as claimed in claim 1 which is a diene rubber comprising units of at least the following units (a), (b), (c) and (d):

(a) units of 1,3-butadiene, 2-methyl-1,3-butadiene, or mixture thereof;

(b) units of at least one vinyl monomer selected from the group consisting of N,N-dimethylaminoethyl (meth) acrylate, N,N-diethylaminoethyl (meth)acrylate, N,N-dipropylaminoethyl (meth)acrylate, N,N-dioctylaminoethyl (meth)acrylate, N-methyl-N-ethylaminoethyl (meth)acrylate, N,N-dimethylaminopropyl (meth)acrylamide, N,N-diethylaminopropyl (meth)acrylamide, N,N-dioctylaminopropyl (meth)acrylamide, N,N-dimethylaminoethylstyrene, N,N-diethylaminoethylstyrene, N,N-dipropylaminoethylstyrene, N,N-dioctylaminoethylstyrene, 2-vinylpyridine and 4-vinylpyridine;

(c) units of at least one hydroxyl-containing vinyl monomer selected from the group consisting of hydroxymethyl (meth)acrylate, 2-hydroxyethyl (meth)acrylate, 2-hydroxypropyl (meth)acrylate, 3-hydroxypropyl (meth)acrylate, 3-phenoxy-2-hydroxypropyl (meth) acrylate, glycerol mono(meth)acrylate, hydroxybutyl (meth)acrylate, hydroxyhexyl (meth)acrylate, hydroxyoctyl (meth)acrylate, hydroxymethyl (meth) acrylamide, 2-hydroxypropyl (meth)acrylamide and 3-hydroxypropyl (meth)acrylamide; and (d) at least one vinyl aromatic monomer selected from the group consisting of styrene, α-methylstyrene, 2-methylstyrene, 3-methylstyrene, 4-methylstyrene, 2,4-diisopropylstyrene, 2,4-dimethylstyrene, 4-t-butylstyrene, 5-t-butyl-2-methylstyrene, monochlorostyrene, dichlorostyrene and monofluorostyrene.

7. A diene rubber as claimed in claim 1 which is a rubber obtained by polymerizing monomers comprising butadiene, styrene, at least one of p-dimethylaminomethylstyrene, N,N-dimethylaminopropylacrylamide and 2-vinylpyridine, and at least one of hydroxyethyl methacrylate and hydroxyethyl acrylate.

8. A diene rubber as claimed in claim 1 which comprises 60 to 99.9% by weight of conjugated diene units, 0.1 to 15% by weight of said vinyl monomer units, and 0.1 to 15% by weight of said hydroxyl-containing vinyl monomer units.

9. A diene rubber as claimed in claim 1 which comprises 50 to 89.8% by weight of conjugated diene units, 0.1 to 15% by weight of said vinyl monomer units, 0.1 to 15% by weight of said hydroxyl-containing vinyl monomer units, and 5 to 50% by weight of aromatic vinyl monomer units.

10. A diene rubber as claimed in claim 1 wherein the hydroxyl-containing vinyl monomer is at least one member selected from the group consisting of hydroxymethyl (meth) acrylate, 2-hydroxyethyl (meth)acrylate, 2-hydroxypropyl (meth)acrylate, 3-hydroxypropyl (meth)acrylate, 3-chloro-2-hydroxypropyl (meth)acrylate, 3-phenoxy-2-hydroxypropyl (meth)acrylate, glycerol mono(meth) acrylate, hydroxybutyl (meth)acrylate, 2-chloro-3-hydroxypropyl (meth)acrylate, hydroxyhexyl (meth) acrylate, hydroxyoctyl (meth)acrylate, hydroxymethyl (meth)acrylamide, 2-hydroxypropyl (meth)acrylamide, 3-hydroxypropyl (meth)acrylamide, di(ethylene glycol) itaconate, di(propylene glycol) itaconate, bis(2-hydroxypropyl) itaconate, bis(2-hydroxyethyl) itaconate, bis (2-hydroxyethyl) fumarate, bis(2-hydroxyethyl) maleate, 2-hydroxyethyl vinyl ether, hydroxymethyl vinyl ketone and allyl alcohol.

11. A process for preparing a diene rubber as claimed in claim 1 which comprises copolymerizing at least one conjugated diene, at least one vinyl monomer selected from the group consisting of primary amino-containing vinyl monomer, anilinostyrene, anilinophenyl-butadiene, N-monosubstituted acrylamides, N-monosubstituted methacrylamides, N,N-disubstituted aminoalkylacrylates, N,N-disubstituted aminoalkylacrylamides, N,N-disubstituted amino aromatic vinyl compounds and pyridyl-containing vinyl compounds, at least one hydroxyl-containing vinyl monomer and, optionally, at least one other copolymerizable monomer.

12. A process as claimed in claim 11 which comprises copolymerizing said at least one conjugated diene, said at least one vinyl monomer, said at least one hydroxyl-containing vinyl monomer and, optionally, said at least one other copolymerizable monomer by emulsion polymerization.

13. A rubber composition comprising a rubber component and a reinforcing agent, the rubber component comprising a diene rubber as claimed in claim 1.

14. A rubber composition as claimed in claim 13 wherein the proportion of the diene rubber in the rubber component is not less than 10% by weight.

15. A rubber composition as claimed in claim 13 wherein the reinforcing agent comprises carbon black.

16. A rubber composition as claimed in claim 13 wherein the reinforcing agent comprises silica.

17. A rubber composition as claimed in claim 16 which further comprises a silane coupling agent.

18. A rubber composition as claimed in claim 17 wherein the silane coupling agent is used in an amount of 0.1 to 30 parts by weight per 100 parts by weight of silica.

19. A rubber composition as claimed in claim 13 wherein the reinforcing agent comprises a mixture of carbon black and silica.

20. A rubber composition as claimed in claim 19 further comprising a silane coupling agent.

21. A rubber composition as claimed in claim 20 which contains 0.1 to 30 parts by weight of silane coupling agent per 100 parts by weight of silica.

22. A rubber composition as claimed in claim 21 wherein the rubber component comprises at least 10% by weight of the diene rubber.

* * * * *